United States Patent [19]

Nürnberger et al.

[11] Patent Number: 4,793,214
[45] Date of Patent: Dec. 27, 1988

[54] PLANET WHEEL CARRIER

[75] Inventors: Günter Nürnberger, Schweinfurt; Günter Look, Bergrheinfeld, both of Fed. Rep. of Germany

[73] Assignee: Fichtel & Sachs AG, Schweinfurt, Fed. Rep. of Germany

[21] Appl. No.: 931,547

[22] Filed: Nov. 14, 1986

[30] Foreign Application Priority Data

Nov. 14, 1985 [DE] Fed. Rep. of Germany ....... 3540343

[51] Int. Cl.$^4$ .............................................. B62M 11/14
[52] U.S. Cl. ................... 74/750 R; 29/159.2; 74/801
[58] Field of Search ......................... 74/750 R, 750 B; 29/522, 159.2; 254/390, 415, 416

[56] References Cited

U.S. PATENT DOCUMENTS

| 3,042,378 | 7/1962 | Preston | 254/390 |
| 3,527,121 | 9/1970 | Moore | 74/801 |
| 3,842,481 | 10/1974 | Laing | 29/159.2 |
| 4,043,021 | 8/1977 | Mosbacher et al. | 74/750 R |
| 4,480,492 | 11/1984 | Fujioka et al. | 74/750 R |

FOREIGN PATENT DOCUMENTS 2337725  2/1975  Fed. Rep. of Germany .

Primary Examiner—Leslie A. Braun
Assistant Examiner—Scott Anchell
Attorney, Agent, or Firm—Toren, McGeady & Associates

[57] ABSTRACT

The planet wheel carrier for a planetary gearing, especially a cycle multi-speed hub, comprises two annular discs (1) of substantially like form shape-stamped out of sheet metal material which are arranged coaxially and in mirror-image to one another each comprising several circumferentially mutually offset cylindrical bearing journals (5) pressed out of the sheet metal material and bridge dogs (11) pressed out of the sheet metal material in the same axial direction between the bearing journals (5) in the circumferential direction. The bearing journals (5) of the two annular discs (1) are aligned by pairs in the mirror-image arrangement and rotatably mount the planet gear wheels (7) arranged axially between the annular discs (1). The bridge dogs (11) lie against one another and are connected firmly with one another by securing means, for example rivets (15). Toothings (17) are provided on the internal circumference of the annular discs (1) for torque transmission. A planet wheel carrier of this kind can be produced at favorable cost and without detriment to its operational reliability.

8 Claims, 4 Drawing Sheets

PLANET WHEEL CARRIER

The invention relates to a planet wheel carrier for a planetary gear, especially a cycle multi-speed hub.

From German Patent No. 1,193,377 a planet wheel carrier consisting of two annular parts is known in which the planet gear wheels are rotatably mounted on separate spindles held in the two annular parts. The two annular parts are secured to one another by means of rivet pins which are produced on one of the two annular parts by cold or hot deformation of the otherwise solid component. For the production of such a planet wheel carrier however relatively great expenditure of swarf-removing working is necessary.

The invention is based upon the problem of forming a planet wheel carrier so that the machining expense necessary for production is considerably reduced, without detriment to the operational reliability of the planet wheel carrier.

The planet wheel carrier according to the invention comprises two annular discs of substantially like form shape-stamped from sheet metal material, which are arranged coaxially in mirror-image to one another and each comprise several cylindrical bearing journals offset in the circumferential direction in relation to one another and pressed out from the sheet metal material, also bridge dogs pressed out of the sheet metal material in the same axial direction between the bearing journals in the circumferential direction. The bearing journals of the annular discs arranged in mirror-image are aligned by pairs, the bridge dogs lying against one another axially by pairs. Annular discs of this construction type have a compact construction form and can be produced at favourable cost by stamping, especially precision stamping, including the bearing journals and the bridge dogs which define the axial spacing of the two annular discs.

After the planet gear wheels are set upon the bearing journals, the two annular discs are secured to one another, for example welded with one another. Laser-welding is especially suitable for the welded connection, since it can be concentrated on regions of closely limited location and distortion of the annular discs is avoided.

Alternatively the two annular discs can also be riveted with one another, the rivets passing through through-passing holes in the bridge dogs. The rivets can be separate components, but the rivets can also be formed as rivet pins pressed out of the sheet metal material in the region of the bridge dogs.

The two annular discs can serve as carriers of additional components of the planetary gearing. More especially additional coupling elements can be formed on the annular discs directly by the stamping operation or additional components can be specially held on the planet wheel carrier by the rivets used for securing the annular discs. For torque introduction or transmission coupling toothings are expediently formed on the internal circumference of the annular discs and are couplable with corresponding matching toothings of the planetary gearing or of the multi-speed hub. In order to prevent these counter-toothings coming into contact in an undesired manner with the planet gear wheels, an abutment plate cranked into the inner opening of the adjacent annular disc can be arranged axially between one of the annular discs and the planet gear wheels and is guided radially on the bearing journals of the planet gear wheels. The abutment plate can have for example through-passing openings for the bearing journals.

When used in multi-speed gear hubs of cycles, change-speed dog clutches are frequently used, such as are described by way of example in German Patent No. 2,337,725. The planet wheel carrier according to the invention permits the productionally simple securing of a dog ring, provided with axially protruding clutch dogs, on the planet wheel carrier. The dog ring has through-passing holes aligned with the through-passing holes of the annular discs and is expediently held on the planet wheel carrier with the rivets which secure the annular discs to one another.

Examples of embodiment of the invention will be explained in greater detail below by reference to drawings, wherein FIG. 1 shows an axial elevation of a planet wheel carrier for a multi-speed hub of a cycle;

Figure 2:
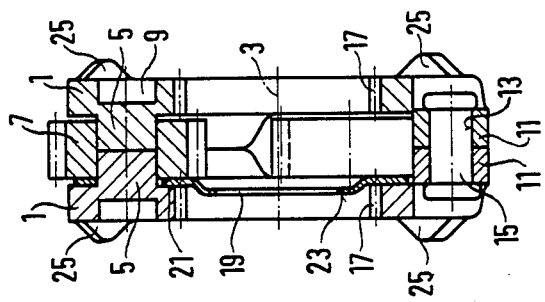
FIG. 2 shows a sectional view of the planet wheel carrier, seen along a line II—II in FIG. 1.
Figure 1:
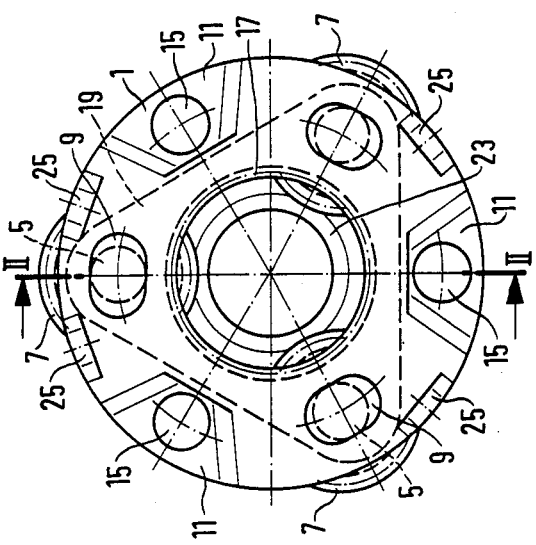
Figure 2A:
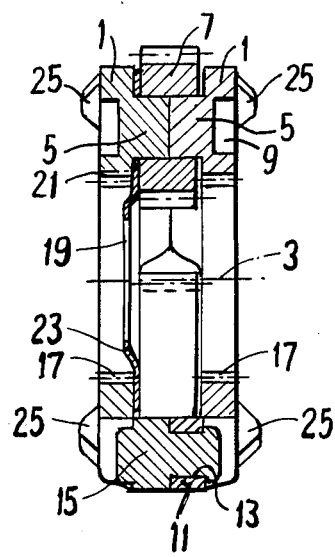
FIG. 2a shows a sectional view of another embodiment of the planet wheel carrier, seen along a line II—II in FIG. 1.
Figure 4:
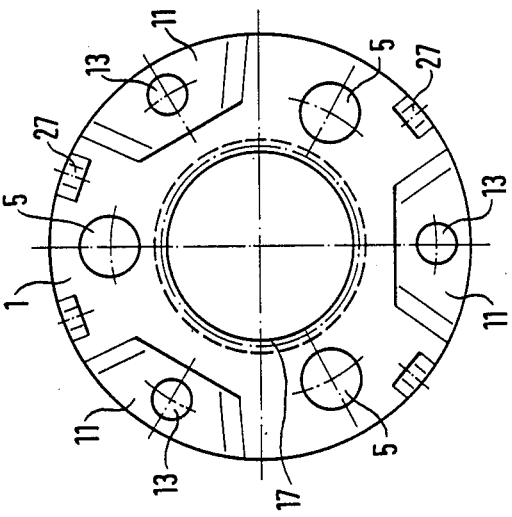
FIG. 4 shows an axial view of the annular disc.
Figure 3:
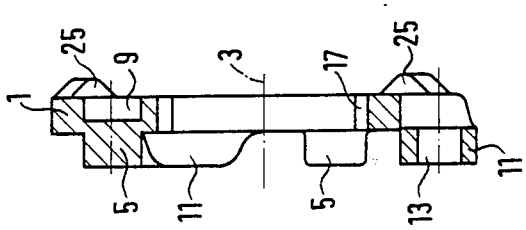
FIG. 3 shows a sectional view of an annular disc used in the planet wheel carrier, seen along the line II—II in FIG. 1.

The planet wheel carrier as illustrated in FIGS. 1 and 2 comprises two like annular discs 1 produced by precision stamping from sheet metal material, which are firmly connected with one another coaxially with the rotation axis 3 of the planet wheel carrier in the planet wheel gearing (not illustrated further), but in mirror-image to one another. FIGS. 3 and 4 show details of one of the annular discs 1. Several cylindrical bearing journals 5 arranged at equal angular distances from one another on a common diameter circle are pressed out of the sheet metal material of the annular discs 1. The bearing journals 5 are arranged so that when the annular discs 1 are assembled they are aligned with one another. One of several planet gear wheels 7 arranged axially between the annular discs 1 is mounted rotatably on each mutually aligned pair of bearing journals 5. In the example of embodiment as illustrated three planet gear wheels 7 are provided arranged offset by about 120° in angle in relation to one another about the rotation axis 3. The pressing out of the bearing journals 5 forms depressions 9 in each case on the opposite side of the annular discs 1, which depressions, in order that sufficiently long bearing journals may be produced, are of elongated oval form in the circumferential direction of the annular discs, as shown best by FIG. 1.

Bridge dogs 11 are passed out of the sheet metal material in the same direction, between the bearing journals in the circumferential direction. When the planet wheel carrier is assembled the bridge dogs 11 of the two annular discs 1 lie against one another in pairs and thus fix the axial distance of the two annular discs 1 from one another. The bridge dogs 11 have through-passing holes 13 through which axial securing rivets 15 pass which hold the two annular discs 1 on one another. FIG. 2 shows the securing rivets 15 as a separate component provided with rivet heads at both ends. However the securing rivets 15 can be pressed out of the sheet metal material of the annular discs 1, similarly to the bearing journals 5. According to the number of the securing rivets, the rivets can be provided only on one of the two annular discs, in which case the annular discs differ from one another as regards this detail, or in the case of an even number of rivets annular discs of like form can be used even here. Alternatively in place of securing by rivets a welded fastening of the two annular discs 1 in the region of the bridge dogs 11 can be used.

In multi-speed hubs of cycles the gears are changed by gear-change clutches in a torque transmission path leading away from or towards the planet wheel carrier. For the torque coupling with the planet wheel carrier toothings 17 are formed preferably by stamping on the internal circumference of the annular disc 1. Axially between one of the two annular discs 1, the left annular disc 1 in FIG. 2, and the planet gear wheels 7 an annular abutment disc 19 is arranged which has holes 21 conforming with the bearing journals 5, through which the bearing journals 5 of the adjacent annular disc 1 pass and fix the abutment disc 19 radially. The abutment disc 19 has on its integral circumference an axially outwardly protruding circumferential crank portion 23 which overlaps axially with the internal toothing 17 of the adjacent annular disc 1, keeps the counter-toothings (not further illustrated) allocated to this internal toothing out of contact with the planet gear wheels 7 and in operation aligns the middle of the planet gear wheels 7 with the middle of the axially wider sun wheel (not shown). In the region of the external circumference of the annular discs 1 axially outwardly protruding distance dogs 25 are pressed outwards from the sheet metal material. FIG. 4 shows the impression traces 27 complementary thereto.

A planet wheel carrier of the construction type as explained above can be assembled from annular discs of completely or nearly equal form, which are preferably produced by a single shape-stamping action. This type of production is simple in manufacturing technique without detriment to the function capacity of the planet wheel carrier in operation.

Figure 6:
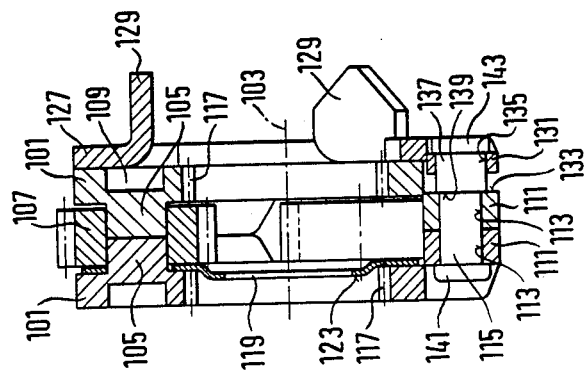
FIG. 6 shows a sectional view of the planet wheel carrier in FIG. 5, seen along a line VI—VI.
Figure 5:
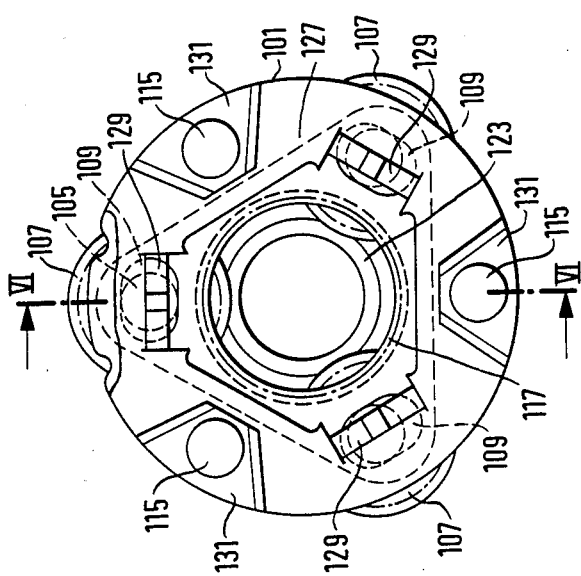
FIG. 5 shows an axial view of a variant of the planet wheel carrier in FIG. 1

FIGS. 5 and 6 show a variant of the planet wheel carrier as explained above which differs from that planet wheel carrier essentially only in that further components of the cycle multi-speed hub are secured to the plane wheel carrier using components already present. Parts of like action are designated by reference numerals increased by the number 100. For the explanation of the assembly and manner of operation reference is made to the description of FIGS. 1 to 4.

On the outside of one of the two annular discs 101 which enclose the planet gear wheels 107 axially between them, the planet wheel carrier carries a dog ring 127 of disc form out of the inner region of which several dogs 129, here three dogs offset in angle by 120° in relation to one another, are bent axially outwards. The dogs 129 are a constituent of a device of the cycle multi-speed hub as described by way of example in German Patent No. 2,337,725 which reliably prevents intermediate change positions of the multi-speed hub. The dog ring 127 has projections 131 axially opposite to the bridge dogs 111 of the annular discs 101, which projections are pressed out of the sheet metal material of the dog ring 127 oppositely to the clutch dogs 129. The projections 131 engage axially in the counter-sunk portions 133 of the annular discs 101 formed by the pressing out of the bridge dogs 111, and have through-passing holes 135 aligned with the through-passing holes 113 in the bridge dogs 111, for axial prolongations 137 of the securing rivets 115. The diameter of the prolongation 137 of each securing rivet 115 is larger than the part penetrating the through-passing holes 113, so that the bridge dogs 111 are clamped against one another between an annular shoulder 139 of the securing rivets 115 and a first rivet head 141. The dog ring 127 is secured by a rivet head 143 formed on the prolongation 137 at the other end of the securing rivets 115. The distance dogs 25 as represented in FIGS. 1 to 4 are not present in the planet wheel carrier according to FIGS. 5 and 6.

We claim:

1. Planetary wheel carrier for a planetary gear, comprising:

(a) two annular discs (1, 101) of substantially the same shape and stamped from sheet metal material and each having an axis and a first surface and a second surface extending transversely of the axis, said discs are arranged coaxially in mirror-image fashion with said first surfaces directed toward one another and with said second surfaces directed outwardly away from one another, each said annular disc has a plurality of axially projecting cylindrical bearing journals (5, 105) formed therefrom on the first surface thereof and angularly spaced apart in the circumferential direction and bridge dogs (11, 111) projecting in the axial direction from the first surface, stamped depressions (9, 109, 133) located in the second surface opposite to the bearing journals and the bridge dogs, and in the mirror-image arrangement of the annular discs (1, 101) the bearing journals (5, 105) are aligned in pairs and the bridge dogs (11, 111) are axially in contact with each other and determine the axial spacing between the annular discs (1, 101), (b) a plurality of planetary gear wheels (7, 107) arranged axially between the annular discs (1, 101) with each said planetary gear wheel rotatably supported on one of the bearing journal pairs (5, 105), (c) attachment means (15, 115) for fixedly connecting the annular discs (1, 101) through the bridging dogs (11, 111), and (d) coupling elements (17, 117) formed on the annular discs (1, 101) serving for a torque-transmitting connection for the planetary wheel carrier.

2. Plane wheel carrier according to claim 1, characterized in that through-passing holes (13; 113) are stamped in the bridge dogs (11; 111) and the recuring means are formed as rivets (15; 115).

3. Planet wheel carrier according to claim 2, characterised in that the rivets are formed as rivet pins pressed out of the sheet metal material in the region of the bridge dogs.

4. Planet wheel carrier according to claim 2, characterised in that a dog ring (127) provided with axially protruding dogs (129) and comprising through-passing holes (135) aligned with the through-passing holes (113) of the annular discs (101) is arranged on the second surface of one of the annular discs (101), and in that the rivets (115) also pass through the through-passing holes (135) of the dog ring (127) and connect the dog ring (127) firmly with the annular discs.

5. Planet wheel carrier according to claim 4, characterised in that the rivets (115) have an annular shoulder (139) and hold the annular discs (101) between the annular shoulder (139) and a first end rivet head (141) and in that for the securing of the dog ring (127) a second rivet head (143) is provided on the side of the dog ring (127) remote from the first rivet head (141).

6. Plane wheel carrier according to one of claims 1 to 5, characterised in that an oval depression (9; 109) is impressed into the sheet metal material on the second surfaces of said annular discs opposite side of each bearing journal (5; 105).

7. Planet wheel carrier according to claim 1, characterised in that the coupling elements are formed as a coupling toothing (17; 117) stamped into an internal circumference of the annular discs (1; 101), and an abutment disc (19, 119) is arranged axially between one of the annular discs (1, 101) and the planet gear wheels (7, 107) and is guided radially on bearing journals (5, 105) and cranked into the adjacent annular disc (1, 101).

8. Planet wheel carrier according to claim 1 characterised in that several mutually circumferentially offset distance dogs (9) are pressed out of the sheet metal material of the annular discs (1) oppositely to the bearing journals (5).

* * * * *